US006269391B1

(12) United States Patent
Gillespie

(10) Patent No.: US 6,269,391 B1
(45) Date of Patent: Jul. 31, 2001

(54) MULTI-PROCESSOR SCHEDULING KERNEL

(75) Inventor: Bruce K. Gillespie, Provo, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 08/878,632

(22) Filed: Jun. 19, 1997

(51) Int. Cl.[7] .................................................. G06F 9/00
(52) U.S. Cl. ............................................ 709/100; 709/102
(58) Field of Search ................................ 709/100, 101, 709/102, 103, 104, 108, 105, 203, 207, 223, 218, 249

(56) References Cited

U.S. PATENT DOCUMENTS

| 5,717,926 | * | 2/1998 | Browning et al. ................... 709/104 |
| 5,721,931 | * | 2/1998 | Gephardt et al. .................... 395/733 |
| 5,774,668 | * | 6/1998 | Choquier et al. ................ 395/200.53 |

OTHER PUBLICATIONS

Customizable Policy Management in the Sting Operating System (James Philbini, Oct. 1992).*

* cited by examiner

Primary Examiner—Majid A. Banankhah
(74) Attorney, Agent, or Firm—Haynes and Boone, LLP

(57) ABSTRACT

A scheduling kernel provides fair share scheduling of several virtual machines by a multi-processor scheduling module scheduling the virtual machines across the several processors of the multi-processor. A virtual machine scheduling module schedules threads of a virtual machine, and provides an independent scheduling policy for a virtual machine. Execution exclusion sets may be created and enforced by an execution exclusion set module to limit execution to a single thread at a time out of any particular execution exclusion set of threads.

39 Claims, 5 Drawing Sheets

MULTI-PROCESSOR SCHEDULING KERNEL

RELATED APPLICATIONS

This application claims the benefit of my co-pending U.S. Provisional Application No. 60/039,064, filed on Feb. 24, 1997 for MULTI-PROCESSOR SCHEDULING KERNEL.

BACKGROUND

1. The Field of the Invention

This invention relates to operating systems for computers of a multi-processor type and, more particularly, to novel systems and methods for providing schedulers within such operating systems.

2. The Background Art

An operating system is software to be executed by a processor of a computer. A multi-processing operating system operates to facilitate operation of multiple processors, usually in a single computer. A multi-processor operating system may be relied upon by executables, such as applications, library routines, and the like, in order to determine an order of execution for each executable.

An operating system provides an interface between the hardware or processor and its associated components, and a higher level executable such as an application. Thus, an operating system provides services to an application by communicating to the hardware on behalf of the higher level application.

Within an operating system, a kernel provides a scheduling function. In general, a kernel is sometimes defined as including not only scheduling software but also memory-management functions, interrupt services, and the like. It is also proper to speak of the scheduling kernel as the kernel or the scheduler, as will be done herein.

Currently known scheduling kernels are not architected to manage effectively, efficiently, nor completely satisfactorily. Many problems arise in scheduling multiple processes, programs, or applications, each having multiple threads.

For example, a thread may run on one processor, while at another time the same thread runs on a second processor. This may result in certain supporting data being moved between caches associated with the two different processors. Coordinating, updating, synchronizing, controlling, passing and validating instances of data structures (e.g. objects) may result in cache thrashing.

Cache thrashing may be thought of as wasting inordinate amounts of valuable processing time administering the coordination of necessary data structures. Scheduling procedures often result in cache thrashing in multi-processor schedulers.

BRIEF SUMMARY AND OBJECTS OF THE INVENTION

In view of the foregoing, it is a primary object of the present invention to provide a multi-processor scheduling kernel for a multi-processing operating system.

Consistent with the foregoing objects, and in accordance with the invention as embodied and broadly described herein, a multi-processor scheduling kernel is disclosed in one embodiment of the present invention as including a multi-processor scheduling module and a virtual machine scheduling module.

The multi-processor scheduling module may select, from a plurality of virtual machines, a virtual machine to be executed by a processor included in the multi-processor. The virtual machine scheduling module may select an order in which to execute threads of a virtual machine. The scheduling kernel may also have an execution exclusion set module for selectively limiting the execution of threads in an execution exclusion set to only one thread at a time.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout. Reference is made to FIGS. 1–5 which illustrate in detail certain currently preferred embodiments of a multi-processor scheduling kernel 20 for providing fair-share scheduling of virtual machines across all processors 12 (i.e., 12a, 12b, 12c) of the multi-processor 10. Those of ordinary skill in the art will, of course, appreciate that various modifications to the detailed schematic diagrams of FIGS. 1–5 may easily be made without departing from the essential characteristics of the invention, as described. Thus, the following description of the detailed schematic diagrams of FIGS. 1–5 are intended only by way of example, and simply illustrate certain presently preferred embodiments consistent with the invention as claimed herein.

Figure 2:
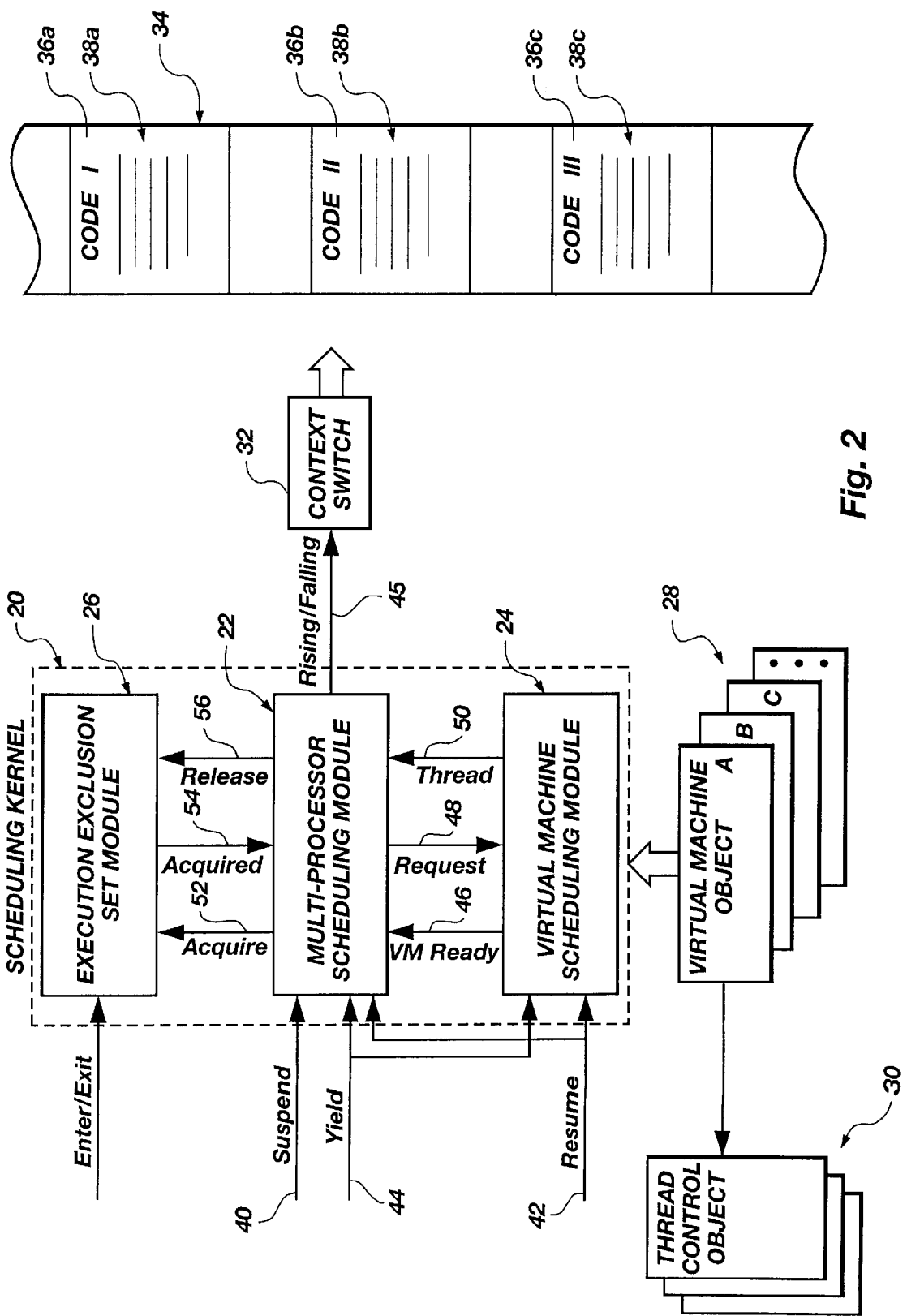
FIG. 2 is a schematic block diagram of a scheduling kernel having a multi-processor scheduling module, an optional virtual machine scheduling module, and an optional execution exclusion set module, where each module is to be stored in the memory device and executed by the multi-processor.

Referring now to FIGS., 1–5, and particularly to FIG. 2, a multi-processing kernel 20 may be embodied to have one or more of four principle features: management of (execution of threads, one-at-a-time) execution exclusion sets by an execution exclusion set module 26; fair-share type scheduling, multi-processing of virtual machines by a multi-processor scheduling module 22; availability of independent scheduling policies for any one, or each, of a plurality of multiple virtual machines; and load balancing using a summed latency of processors, latency of threads, or both to determine when a processor is over or conversely under loaded.

An operating system's kernel is sometimes defined as including not only scheduling software but also memory management functions interrupt services, and so forth. However, for the purposes of this invention, a kernel is intended to mean merely a scheduler, also referred to as a scheduling kernel 20.

Referring to FIG. 2, the scheduling kernel 20, or scheduler 20, operates as an "execution scheduler" by ordering threads for execution by a processor 12.

It is important to recall that a thread is merely a logical entity of code. Accordingly, a thread may be thought of as a unit or thread of execution. A thread may be instantiated in multiple processors, or with multiple sets of operating and controlling data (e.g. different virtual machine objects), and yet operate from the same lines of code from the same available code segments.

In general, a scheduler 20 may also order groups of threads. A group of threads may sometimes be referred to as a task, a process, application, virtual machine, or the like.

The point of having a scheduler 20 is a determination of which thread or which group of threads out of several in question should be executed. In order to alter such scheduling or arrange such scheduling, a scheduler 20 must perform a context switch 32. A context switch 32 may be thought of as saving a state of an executable currently executed by a processor 12a, 12b or 12c (the state of the processor for the "falling" thread to be temporary terminated), and loading the context of a rising thread (setting the state of the processor to that required for proper execution of the rising thread at its next appropriate instruction).

For every thread, there exists a thread-control object 30 in memory 16. A portion of the thread-control object 30 is a data block that represents the state of the processor for executing the associated thread. During a context switch 32 one may think of an object 30 or a thread-control object (TCO) 30 corresponding from a falling thread and a thread control object (TCO) 30 of a rising thread.

A mechanism 32 responsible for performing a context switch will typically be passed two addresses 45, a first address for storing the context information in the TCO 30 of the falling thread, and an address from which to draw the context information out of the TCO 30 of the rising thread. Thus, both the state of the processor for executing the thread that is rising, as well as a pointer to the actual executable code of the thread (an instruction pointer) are included in the context information.

One may think of a context as one would view a chess board. When a game is interrupted, or another party comes to play a game on a single board, one may record the position of each piece on the board being dismantled. Accordingly, a new game may be set up temporarily, but the original game may be set up at some later time with the context properly recorded. Thus, the original game may have its game pieces set up in order with the next move available as if the game had never been interrupted.

Figure 1:
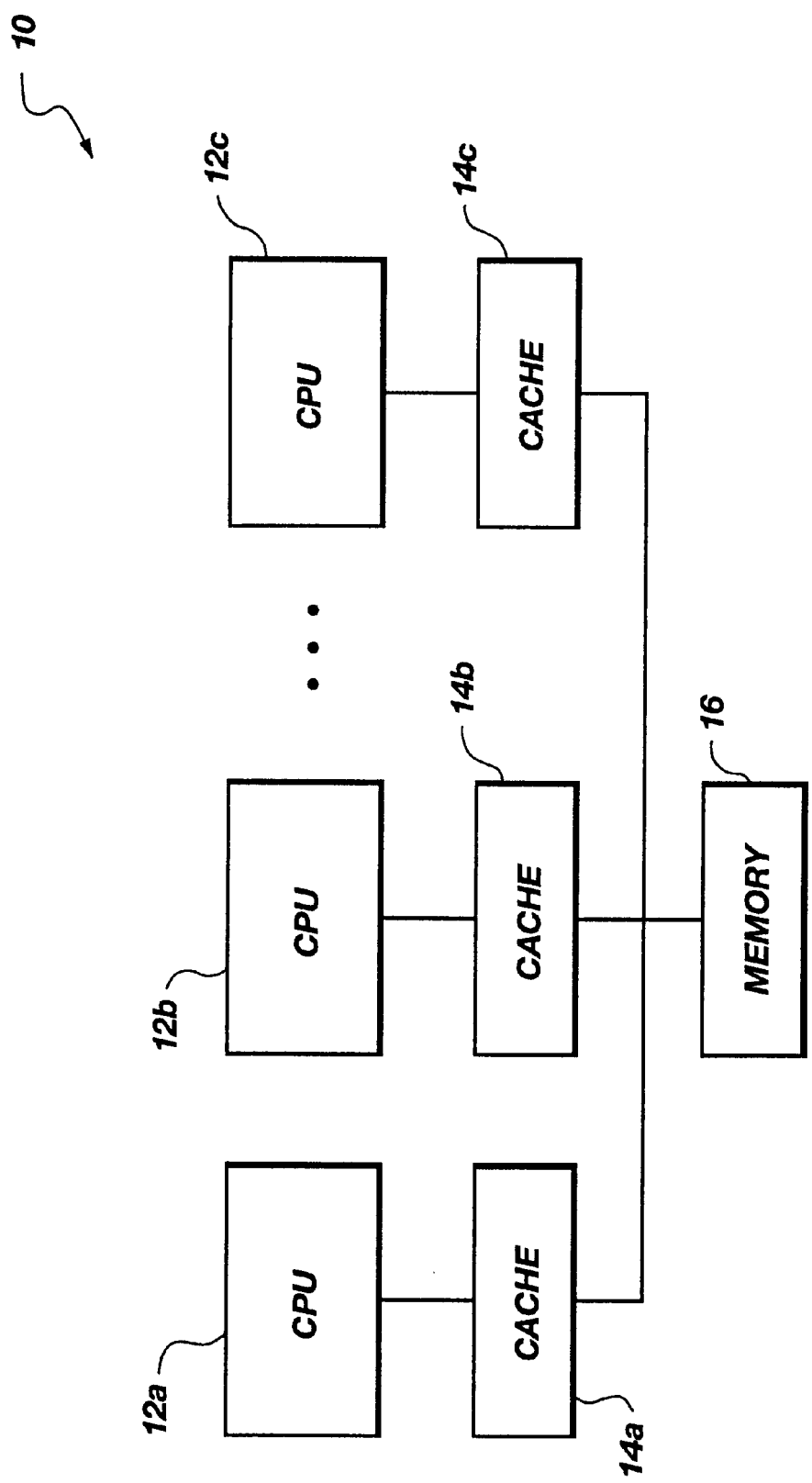
FIG. 1 is a schematic block diagram of a multi-processor, the memory of which may store executables, objects, and other data structures whose execution or use by the multiple processors is to be scheduled in accordance with the invention.

Referring to FIGS. 1–5, and more particularly FIGS. 1–2, an apparatus and method in accordance with the invention, may include a multi-processor 10, programmed to have a scheduler 20, a scheduling kernel 20. A multi-processing scheduling module 22 provides scheduling for several virtual machines executing in a multi-processor 10. A virtual machine processor module 24 provides scheduling of threads within a virtual machine.

As a practical matter, a scheduler 20 should not maintain any tracking of the contexts of threads that are to be run or that have been run. Rather, a scheduler 20 typically receives one of three inputs, a suspend 40 (stop), a resume 42 (start), or a yield 44.

In general, any thread is initialized or started at some executable instruction. After a period of execution, the thread may require additional information that is not currently available. Accordingly, execution of the thread must be suspended until the required information is available in a queue or other data structure to be provided to the thread. When the data is available as required, the thread may again resume execution.

A yield event 44, (signal, command, data, etc.) may be received from an interrupt, a currently executing thread, or the like. The yield event 44 indicates to the processor 12 (i.e., 12a, 12b, or 12c) that the signalling source (currently executing thread) will relinquish control of the processor 12, but will be queued or otherwise rescheduled to execute again in turn. The yielding thread will be scheduled according to the scheduling rules of the scheduling module 22 to execute again.

A yield event 44 may arise from a time-out due to expiration of some quantum of time available for execution, preemption by a higher-priority thread, or the like. The typical case involves a time-out. An implicit yield may come from a process or device outside a thread, while an explicit yield may be programmed into the thread itself. Such an explicit event may be generated by the thread due to circumstances anticipated and programmed into the thread.

In summary, the potential inputs for a multi-processor scheduler 22 include a suspend 40 (stop/wait) to suspend execution of the thread, a resume 42 (start), to initiate or to continue execution of the thread, and a yield 44 to relinquish control of the processor 12 (i.e., 12a, 12b, or 12c) by an executing thread in favor of some other thread.

An output of the multi-processor scheduling module 22 is information 45 (regarding the rising and falling threads) needed to perform a context switch 32. The context switch 32 saves out the state of the falling thread at the address designated in the thread control object 30 corresponding thereto, and programs the processor 12 (12a, 12b, or 12c) with the context of a context state associated with the thread control object 30 found at the address designating the rising thread.

In one currently preferred embodiment 10 of an apparatus and method in accordance with the invention, a group of threads may be assembled into a virtual machine. The virtual machine may be scheduled by a multi-processor scheduling module 22. The multi-processor scheduling module 22 may itself be instantiated in several instances, each associated with one processor 12 (12a, 12b, or 12c) of the several processors 12a, 12b, 12c available in a multi-processor 10 or a multi-processing environment 10. In addition, a master instance may provide cross-processor functions among the different processors with their respective instantiations of the multi-processor scheduling module 22.

Since it is dealing with one or more a virtual machines, each made up of several threads, the processor scheduling module 22 may be designed to operate more effectively by not dealing directly with individual threads within a virtual machine in every case. For example, upon receiving a resume signal 42 or resume command 42 a processor scheduling module 22 may immediately forward the command 42 to a virtual machine scheduling module 24 operating under the control of the processor scheduler 22.

Alternatively, a resume signal 42 may be sent directly to the virtual machine scheduling module 24 for pre-processing prior to engaging the services of the processor scheduler 22. The receipt of a resume 42 by a processor scheduling module 22 for forwarding to a virtual machine scheduler 24, and the receipt of a resume 42 directly by the virtual machine scheduling module 24 are equivalent events.

Within the multi-processor scheduler 22, the scheduling kernel 20 is scheduling virtual machines. Each virtual machine preferably will maintain integrity of the virtual machine execution. Meanwhile, the virtual machine scheduling module 24 will carry the load or perform the scheduling required for each of the thread within the virtual machine.

In general, the process scheduling module 22, multi-processor scheduling module 22, may store information identifying all the virtual machines that have some thread ready to execute on a respective processor. A virtual machine scheduling module 24 may maintain an ordered list of the threads that are ready to be executed. In one presently preferred embodiment, the ordering of the list of virtual machines, maintained in the multi-processor scheduling module 22, may be based upon a fair-share scheduling approach.

Fair-share scheduling of threads is very different from Fair-share scheduling of virtual machines. Each virtual machine's access to processors 12 of the multi-processor 10 may be treated as one scheduling problem by the multi-processor scheduling module 22.

Meanwhile, a virtual machine scheduling module 24 may be implemented to schedule threads within a virtual machine. The ordering of the list of threads in a virtual machine, maintained by a virtual machine scheduling module 24, may reflect, in one current embodiment, an independent scheduling policy associated with the respective virtual machine.

A multi-processor scheduling module 22 may receive a suspend signal 40. The multi-processor scheduling module 22 will then initiate a context switch 32 suspending the current thread executing on the respective processor 12. The state of the processor 12 corresponding to the current thread will be saved in a context object or context field 130 within a thread control object 30.

Similarly, the multi-processor scheduling module 22 may receive a yield command 44. A yield signal 44 or yield command 44 will result in a context switch 32 by the multi-processor scheduling module 22. However, a yield signal 44 may also be directed simultaneously to the virtual machine scheduling module 24 and the multi-processor scheduling module 22.

Since a yield 44 is equivalent to a suspend 40 and a resume 42, a virtual machine scheduling module 24 may immediately respond to a yield instruction 44 by forwarding a ready signal 46 (virtual machine ready) to the multi-processor scheduling module 22. The virtual machine scheduling module 24 has the ability to schedule another thread other than that thread (original) generating the yield signal 44. The virtual machine scheduler 24 may return the original thread to the ready queue by way of a virtual machine ready instruction 46 to the multi-processor scheduling module 22.

A resume instruction 42 may be sent to the virtual machine scheduler 24. Like a yield instruction 44, a resume instruction 42 may prompt the virtual machine scheduling module 24 to forward to the multi-processor scheduling module 22 a virtual machine's ready signal 46. The virtual machine scheduling module 24, by the ready signal 46 may identify the next, appropriate, available thread to be run from the designated virtual machine.

The designated virtual machine is actually selected by the multi-processor scheduling module 22, in one currently preferred embodiment. Thus, the multi-processor scheduling module 22 effectively schedules virtual machines to be run, while the virtual machine scheduling module 24 schedules threads within a designated virtual machine to be executed.

The multi-processor scheduling module 22 sends to a virtual machine scheduler 24, a request 48 for a thread. Associated with a request 48 for a thread is an identification of the virtual machine from which a thread is to be selected. Accordingly, the virtual machine scheduling module 24 implements a scheduling policy for determining which thread (selected thread) of the designated virtual machine is next to run. The virtual machine scheduling module 24 then returns that selected thread 50 (or an identifier thereof, etc.) from that designated virtual machine to the multi-processor scheduling module 22.

Upon receipt of a thread 50, thread designation 50, thread pointer 50, or the like, the multi-processor scheduling module 22 executes a context switch 32. The context switch 32 uses the newly designated thread 50 as the rising thread, retiring a currently-executing thread as the falling thread. Each thread 50 may have an associated thread control object 30 to store data corresponding to the respective thread 50.

A thread control object (TCO) 30 may contain several data structures. One data structure may be a context object 130. A context object 130 may contain data effective to establish a state of a respective processor on which a corresponding thread of a virtual machine is to be executed. In addition, binding data 136 for binding a processor to a thread, as well as membership data 140 identifying a virtual machine to which a thread corresponding to a TCO 30 pertains, may be included.

Another membership may be an execution exclusion set membership 142. A thread or a virtual machine may be a member of an execution exclusion set 142. An execution exclusion set 142 is a group of threads or virtual machines, none of which may be processed in parallel. Thus, whenever one member of an exclusion set 142 (execution exclusion set 142) is executing on any of the processors 12 in a multi-processor system 10, no other member of the exclusion set 142 may be executing.

A virtual machine object 28 (or virtual machine data object 28) may contain its own independent, or even individual and unique, scheduling policy 122. A scheduling policy 122 determines the order of execution of the threads in the corresponding virtual machine.

A virtual machine object 28 may also contain either pointers to code, or the code itself, that will actually be executed by the various threads of a virtual machine. A virtual machine object 28 may be embodied as simply a data instantiation for supporting execution of code shared by two or more threads.

In one currently preferred embodiment of an apparatus and method in accordance with the invention, every processor 12 (12a, 12b, and 12c) of a multi-processor system 10 may contain an instantiation of a virtual machine object 28. The virtual machine object 28 may contain data corresponding to multiple threads. In one embodiment, a virtual machine object 28 may typically contain pointers to logical addresses corresponding to each of the respective threads. Accordingly, the respective processor 12 may load and execute the code available at the address location to which a thread pointer is pointing.

In one embodiment, a thread pointer may point to a thread control object 30. The thread control object 30 may contain all of the necessary data and addressing information pertinent to the respective thread. Thus, a pointer to a thread control object 30 may be identified in a virtual machine object 28.

Figure 3:
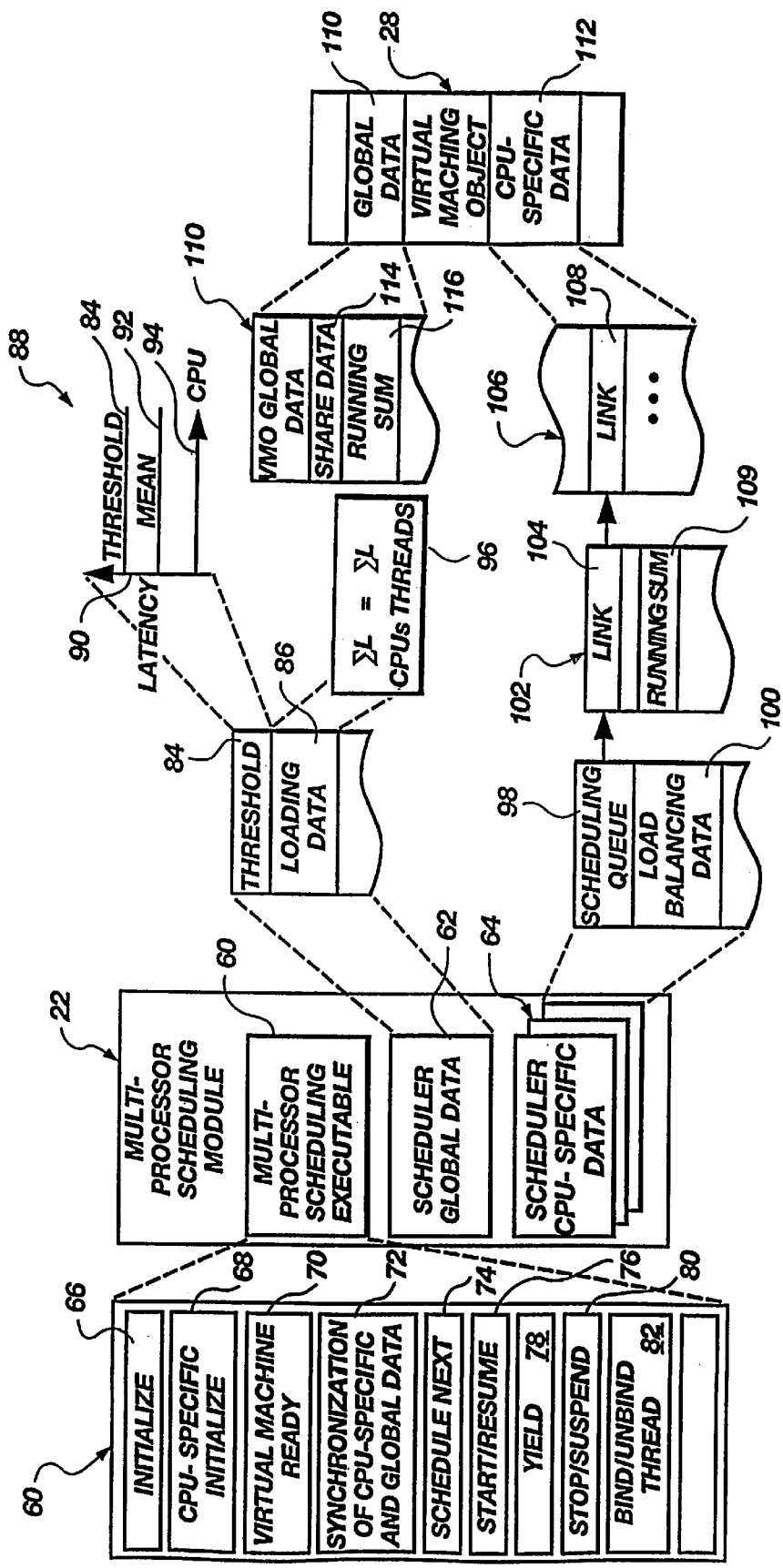
FIG. 3 is a schematic block diagram of additional detailed data structures that may be created in the multi-processor scheduling module.
Figure 4:
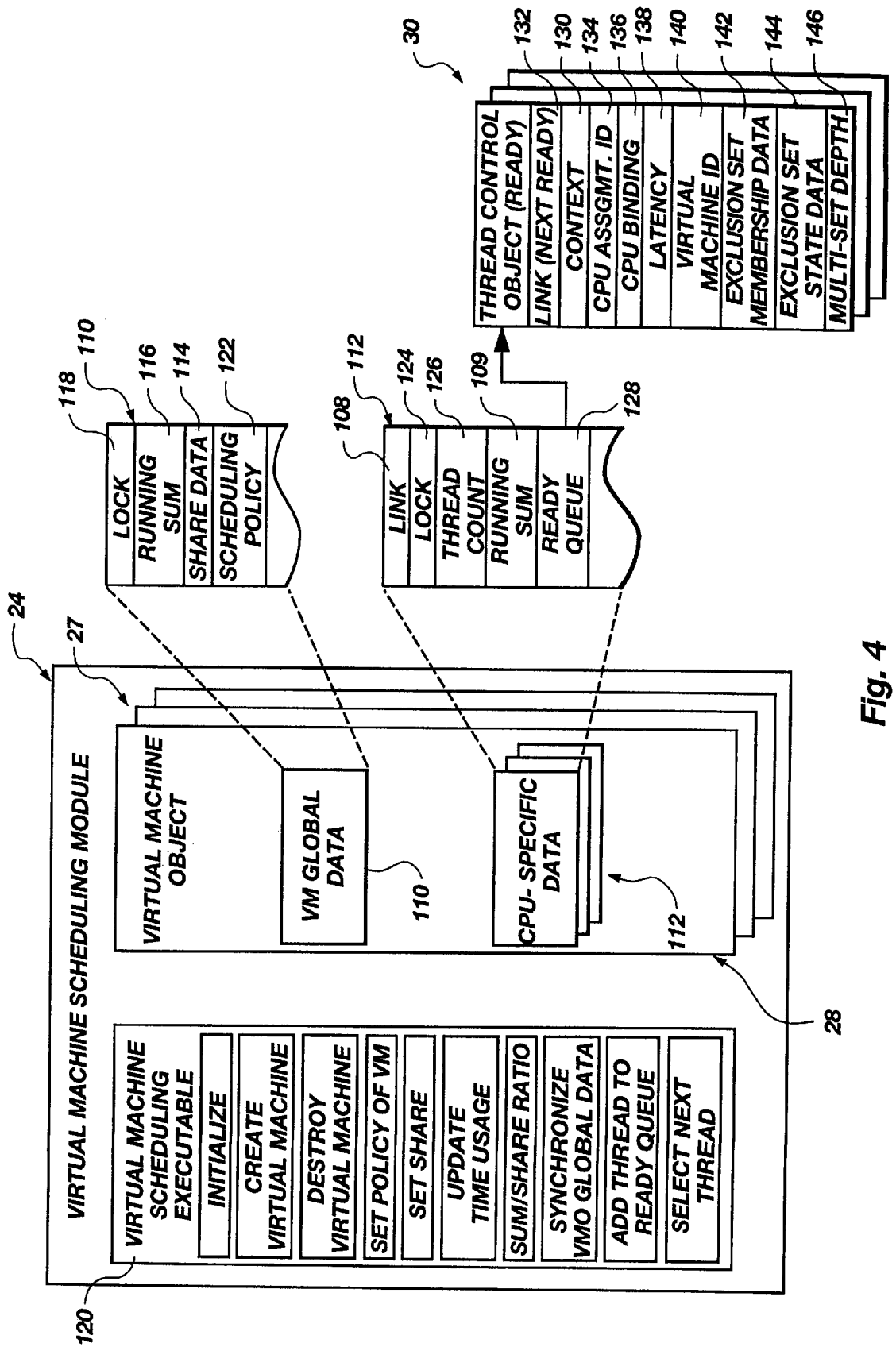
FIG. 4 is a schematic block diagram of one embodiment of data structures, such as the virtual machine scheduling executable, global data, and CPU-specific (local) data, that may be created in the virtual machine scheduling module.

Referring to FIGS. 2–4, and particularly referring to FIG. 3, a multi-processor scheduling module 22 may include a multi-processor scheduling executable 60, global data 62, and CPU-specific data 64. The scheduling executable 60 may include several smaller executables. For example, an initialize procedure 66 or executable may initialize global data structures 62 by allocating memory and the like. A CPU-specific initialize 68 may similarly initialize the CPU-specific data objects 64 associated with the multi-processor scheduling module 22 or scheduling module 22. A virtual machine ready executable 70 may receive a virtual machine ready signal 46 from a virtual machine scheduling module 24.

The ready executable 70, or virtual machine ready executable 70, may then add a virtual machine responsible for the virtual machine ready signal 46 to the scheduling queue 98 of the CPU-specific data 64 associated with the multi-processing scheduling module (MPSM) 22.

A synchronization module 72 may provide synchronization of CPU-specific and global data 62, 64. That is, the global data 62, or scheduling module global data 62, must be updated using the CPU-specific data 64 available. Thereupon, the global data 62 is again distributed to the CPU-specific data structures 64.

A schedule next executable 74 may respond to a suspend 40 or resume 42 associated with one thread by obtaining the next virtual machine in the scheduling queue 98, and issuing a request 48 for a thread 50 to that selected virtual machine scheduling module 24. A resume executable 76 or start executable 76 may indicate that a thread is ready to run. Since each thread has an associated thread control object 30 having a CPU assignment identifier 134 (CPU ID) and a virtual machine identifier 140 (virtual machine ID), the resume executable 76 may determine which ready queue 128 in which CPU-specific data structure 112 of a virtual machine object 28 of the virtual machine specified by the thread control object 30 should receive the thread for execution.

A yield executable 78 may receive data indicating a current thread running on a processor 12 associated with a multi-processor scheduling module 22. The yield executable 78, or simply the yield 78, may immediately re-schedule a thread originally providing the yield signal 44 to the multi-processor scheduling module 22. A yield 78 may thus be equivalent to, or perform, both a stop and a re-scheduling. A re-scheduling for later execution causes the multi-processor scheduling module 22 to select another thread for a context switch 32.

A stop 80 or suspend 80 executable indicates that execution of a thread is to be blocked from further execution. Thus, a stop 80 or suspend 80 may be thought of as an event, or an executable, for fielding a suspend signal 40 received from a currently executing thread. It may then provide internally another schedule next operation.

The bind/unbind thread executable 82 is effective to selectively bind a particular thread to a particular processor 12 (12a, 12b, or 12c). Accordingly, a bind/unbind thread executable 82 is effective to alter the CPU binding in a thread control object 30 corresponding to a thread. A bind/unbind thread executable 82 may have a specified thread, or may be programmed to operate on a current thread. In general, a yield executable 78 and a stop/suspend executable 80, will typically operate on a currently executing thread. Meanwhile, a start/resume executable 76 will specify a thread.

Referring to FIG. 3, the CPU-specific data 64 for the scheduling module data, may include a scheduling queue 98. The scheduling queue 98 may contain data pointing to a CPU-specific data segment 102 from a virtual machine object 28. Accordingly, the scheduling queue 98 may be thought of as a pointer pointing to the virtual machine data structure 102 or virtual machine object (VMO) 28 for a particular CPU 12 (12a, 12b, or 12c) in question. Accordingly, the VMO CPU-specific data 102 may link to other similar data structures 106 through use of a link 104. The running sum 109 in the virtual machine object 28, and pertaining to the CPU in question, together with the share data 114 from the global data 110 in the same virtual machine object 28, may be used to control scheduling by the multi-processor scheduling module 22. That is, for example, a running sum from the CPU-specific data 64 of a virtual machine object 28, divided by the share from the global data 110 of the same virtual machine object 28, forms a time-to-share ratio. The time-to-share ratio may be compared against similar ratios for other CPU-specific data 64 corresponding to other virtual machines to determine which virtual machine will be next scheduled by the multi-processor scheduling module 22. For example, a virtual machine having a lowest value for a ratio running sum divided by shares, may be selected as a next virtual machine to be scheduled by the multi-processor scheduling module 22.

The CPU-specific scheduling module data 64 may also include load balancing data 100. The load balancing data 100 reflects latency of the processor 12 (12a, 12b, or 12c) in question. The latency of a processor 12 reflects, in turn, a summation of the latencies corresponding to all of the threads that have been run during some window of time, on that processor 12 in question. Accordingly, the load balancing data 100 reflects an individual processor's ability to process all threads. By contrast, latency data for an individual thread reflects that individual thread's wait times as experienced across all processors 12 in a multi-processor 10. Accordingly, load balancing data 100 in the CPU-specific scheduling data 64 reflects how heavily loaded a particular processor 12 is. By contrast, latency data within the CPU-specific thread data 64 reflects, or may be interpreted to reflect, the contribution of a particular thread to delays or waits.

The scheduling module global data 62 may contain threshold data 84 and loading data 86 as well as other data suitable for supporting a scheduler. The threshold data 84 may indicate some threshold 84, over which loading condition, a processor 12 may be directed to shed threads. For example, in one embodiment in accordance with the invention, latency 90 may be used for determining loading. Loading data 86 may correspond to, for example, the summation 96 of all latencies over all CPU's 12 in a multi-processor 10. This summation 96 is the same value as the summation of all latencies of all threads running in the multi-processor 10. Accordingly, a value of latency 90 may be stored as the loading data 86 in a scheduler's global data 62.

If the loading data 86 corresponds to a latency value 90 (or other loading parameter) greater than some threshold value 84, then a particular processor 12 (12a, 12b, or 12c), corresponding to the scheduler 20, may be deemed to be overloaded. Accordingly, the overloaded processor 12 may be directed by the scheduling module 22 to shed threads to another processor 12 having a latency 90 less than the mean latency value 92. For example, a processor 12 (12a, 12b, or 12c) that is operating above a mean value 92 of latency may be carrying more than its share of execution. Thus, the latency 90 differential between a mean 92 and a threshold value 84 provides a control "deadband." Thus, some stability may be provided by suitable selection of a threshold value 84. A threshold value 84 may be selected as a matter of design choice based on some previous knowledge of the operation of a processor 12, a particular thread, or the like. Similarly, a strategy for shedding threads may be based upon some individual latency 90 of a particular thread contributing to a particular processor's 12 exceeding a threshold value 84 of latency. Thus, in general, a threshold value 84 is a matter of design choice.

Referring to FIG. 4, a virtual machine scheduling module 24, may include a virtual machine scheduling executable 120 and one or more virtual machine objects 28.

In one embodiment of an apparatus and method in accordance with the invention, some number of virtual machines may be stored in a memory device 16. The virtual machines may be identified by some suitable method. In one currently preferred embodiment, all the virtual machines available to execute on a multi-processor 10 may be identified in a virtual machine list 27. Each entry in the list 27 may represent some data identifying a particular, corresponding, virtual machine object 28 defining a virtual machine.

An entry in a virtual machine list 27 identifying a particular virtual machine object 28 may identify that virtual machine object 28 to the scheduler 22. A virtual machine object 28 may contain global data 110 applicable to every execution of the virtual machine, independent of which processor 12 in a multi-processing system 10 is engaged.

The virtual machine object 28 may also contain CPU-specific data 112. CPU-specific data 112 is that information that is unique to an individual processor (CPU) 12 (12a, 12b, or 12c) executing the virtual machine in question, at any particular time.

In one embodiment, global virtual machine data 110 may include a lock 118, running sum 116, share data 114, policy data 122, and additional data not required for the scheduler 22. Alternatively, additional data may include scheduling module data that is not required for the invention, but is useful for implementing specific details of the virtual machine or a scheduling policy.

The lock 118 may provide data effective to prevent concurrent modification of the global virtual machine data 110 by multiple processors 12. The running sum 116 may contain a value representing some total time that the virtual machine has been executing on all processors 12 up to a certain reported time. In general, the running sum 116 represents the total time that has been used by all processors 12 for executing threads of the virtual machine in question during some time window of interest up to some last synchronization event.

Share data 114 may be thought of as shares of time, analogous to shares of stock. Accordingly, each virtual machine contending for processor time on a particular processor 12 receives time proportional to the total shares held by the virtual machine in question with respect to the total number of shares of all contending virtual machines on the processor 12.

Policy data 122 may be thought of as information used by a virtual machine scheduling module 24 to determine a preferred method for scheduling the individual threads in the virtual machine in question. Additional data may relate to the policy, support of the virtual machine execution, and the like.

The CPU-specific data 112 may include a lock 124, a thread count 126, a ready queue 128, a running sum 109, and additional data. The lock 124 may serve to prevent concurrent modification, by different processors 12, of the CPU-specific data 112. One may think of a virtual machine as a collection of threads having some relationship. For example, one beneficial relationship is merely that some group of threads may be more efficiently scheduled together. A thread count 126 may identify how many threads are members of the virtual machine.

Each virtual machine may be represented by a virtual machine object 28. A virtual machine object 28 may contain one instance of global data 110, and multiple instances, one per processor 12 (12a, 12b, or 12c), of processor-specific data 112. Virtual machine objects 28, together with a virtual machine scheduling executable 120 may implement several virtual machines. Code to be run may be referenced by the virtual machine objects 28. Implementation may be similar to that of the multi-processor scheduling module 22 (scheduler), which likewise has one instance of global data 62, and multiple instances of CPU-specific data 64, one for each processor 12 available.

As a practical matter, global data 110 and CPU-specific data 112 may be implemented in a single object, multiple objects, or simply as data or sets of data, in any suitable format. However, as a logical proposition, CPU-specific data 112 pertaining to a specific processor 12 (12a, 12b, or 12c) may be thought of as CPU-specific data 112 for that processor 12 in the virtual machine object 28, or in the scheduling module data, respectively.

A ready queue 128 may store a list (queue, etc.) of values pointing to thread control objects 30. A running sum 109, alternately referred to as a local running sum 109, pertaining to local data 112 (CPU-specific data) contains a value corresponding to the running time currently elapsed on the CPU 12 in question. It may also include the total global running time of the virtual machine as previously synchronized. In one embodiment, the running sum 109 may actually be only the total time elapsed since the previous synchronization. In either event, or some other implementation, the local running sum 109 may be combined with the information in the global running sum 116 to provide an updated global running sum to be redistributed to all processors 12. Again, additional local data 112 (CPU-specific data) may be policy specific data, implementation-specific data, CPU-support data, or other data that may be conveniently or efficiently stored in the local or CPU-specific data 112.

The ready queue 128 may point to several thread control objects 30. A thread control object 30 may contain a link 132. A link 132, well understood in the art, may point to an additional thread control object 30 to be next accessed after a current thread control object 30.

In general, a thread control object 30 will contain context data 130. Context data 130 corresponds to a state of a processor 12, which state last existed or will initially be loaded to a processor 12 executing the subject thread.

A thread control object 30 is specific to a particular thread within a particular virtual machine. Accordingly, the thread control object 30 may contain processor data 134 identifying the processor to which the particular thread in question is assigned. Likewise, in conjunction with the processor data 134 or separately therefrom, binding data 136 may provide an association relating a thread corresponding to a thread control object 30 to a specific processor 12, which binding may not be interfered with by a scheduler 22.

The latency data 138 may include one or more values corresponding to the time elapsed between a thread in question becoming ready and the thread actually executing. This information varies substantially from conventional duty cycles. Latency data 138 focuses on time wasted in a wait state by a thread awaiting processor execution. It is preferably, in one embodiment, not the shared amount of processing time, the total used time associated with a particular processor across all virtual machines and threads being run thereon, or any other measurement schemes of the like. Latency data 138 reflects the efficiency or effective speed of processing threads, once available to be processed. Duty cycles instead reflect the amount of available processor time that is actually used by a processor 12.

Thread control objects 30 may contain virtual machine identifiers 140. A virtual machine identifier 140 may contain a pointer or other binding information identifying the virtual machine to which a thread control object 30 pertains, or to which the thread in questions pertains.

Execution exclusion set membership identifiers 142 may be included in a thread control object 30 to provide a binding to, or membership identification in, a particular set of threads. Exclusion sets 142 correspond to threads that may not be processed in parallel.

Exclusion set state data 144 may be included in a thread control object 30. Exclusion set state data 144 is optional, along with exclusion set membership identifiers 142. That is, an execution exclusion set is not required in all embodiments of apparatus and methods in accordance with the invention. In one currently preferred embodiment, exclusion set state data 144 may include membership data 142 identifying all exclusion sets to which a particular thread belongs, along with status information or key information identifying whether or not certain required locks have become available for a thread. Exclusion set state data 144 may reflect additional data pertaining to the readiness of a thread for execution. In particular, exclusion set state data 144 may be useful to an execution exclusion set module 26.

Each set of local data 112 (CPU-specific data) may include a link 108. The link 108 may provide linking between a particular virtual machine executing on a processor 12 scheduled by the multi-processor scheduling module 22, and another, queued, virtual machine ready to be executed by the same processor 12. Thus, a parallel linkage exists between ready threads within a single virtual machine to be scheduled by a virtual machine scheduler 24, and a group of ready, queued, virtual machines, ready to execute, and scheduled by a multi-processor scheduling module 22 associated with a particular processor 12.

The global data 110 in the virtual machine object 28 contains a value corresponding to the total execution time that the particular virtual machine has been given across processors 12. Similarly, the VMO CPU-specific data 112 contains a running sum 109 that reflects the additional time that a particular thread has been running on a particular processor 12 before being preempted, blocked, or otherwise stopped, such as by yielding. Moreover, multiple threads may execute on a single processor 12 between updates of global data 110 within a virtual machine object 28. Accordingly, the running sum 109 in the VMO CPU-specific data 112 may be maintained between periodic updates of the VMO global data 110. Thereafter, each instantiation of CPU-specific data 112 of a virtual machine object 28 may be updated with the running sum data 116 from the global data 110 corresponding to the virtual machine object 28.

In one embodiment, each virtual machine object 28 may maintain a running sum 109 by adding all execution times since the last update, added to an initial updated value obtained from the global running sum 116. Any number of design choices may be made for maintaining within a virtual machine object 28 any necessary data relating to most-recently-updated global running sums 116, and a local running sum 109.

Figure 5:
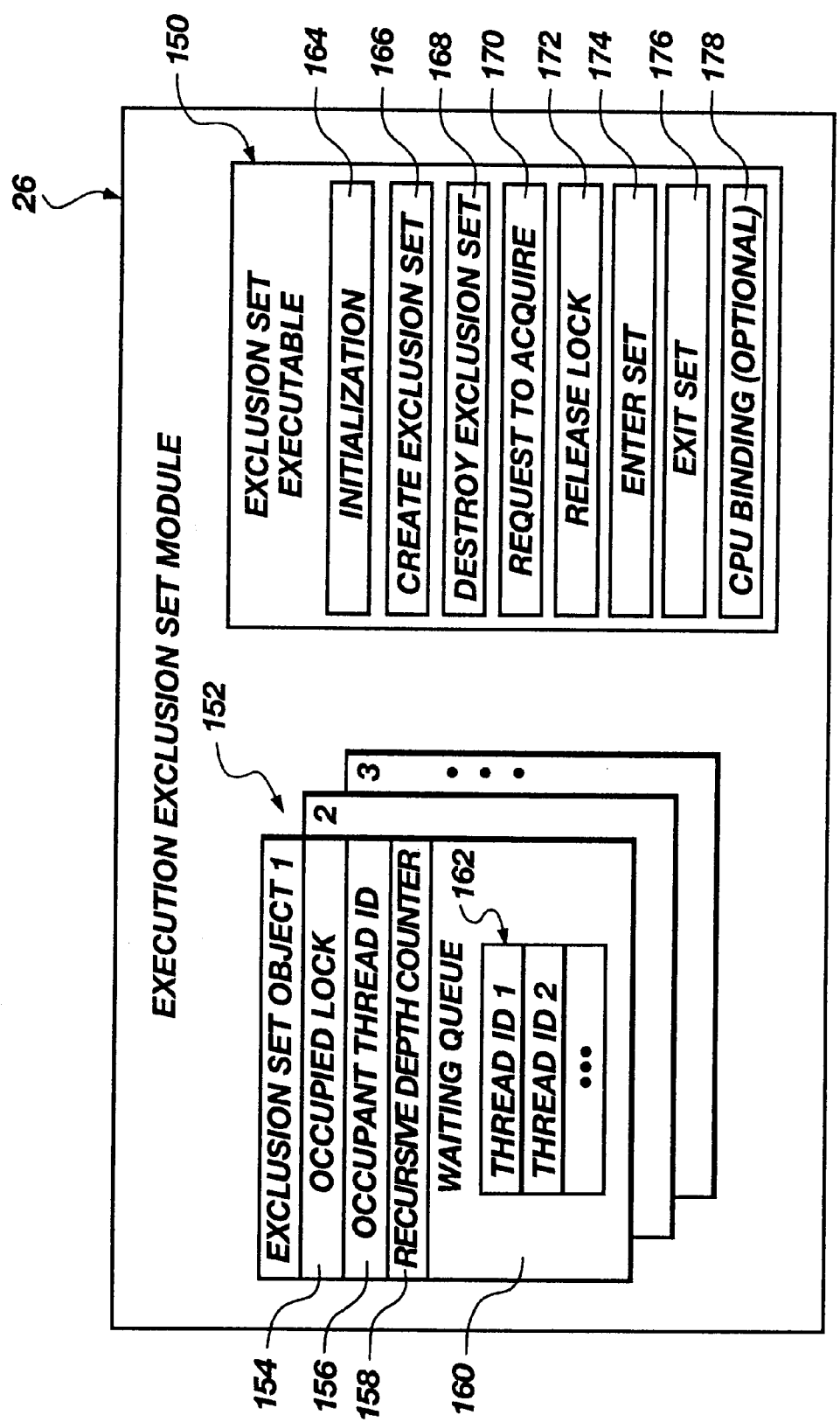
FIG. 5 is a schematic block diagram of an execution exclusion set module illustrating one embodiment of data structures that may be created in the exclusion set executable and exclusion set objects.

Referring to FIG. 5, an execution exclusion set module 26 may operate according to one of several approaches. For example, in one embodiment, a multi-processor scheduling module 22 may receive a thread 50 from a virtual machine scheduler 24. If the designated thread 50 has possession of the necessary execution exclusion set key, then an exclusion set executable 150 of the execution exclusion set module 26 may return an acquired signal 54, permitting the multi-processor scheduling module 22 to cause execution of the respective thread by the processor 12.

The actual assignment or tracking of the "possession" or "occupation" of an execution exclusion set key 154 or lock 154 by a particular thread may be done by the execution exclusion set module 26 itself, or some other process (executable) entity. Nevertheless, an execution exclusion set module 26 may contain the exclusion set executable 150 to control storage of the exclusion set objects 152. It may thereby centrally track the availability of the key 154, designating it as acquired when it is available for a new member of an execution exclusion set to be executed.

A multi-processor scheduling module 22 may send a release signal 56 to the execution exclusion set module 26 upon completion of the processing by a current thread. For example, when a suspend instruction 40 or yield instruction 44 is received by the multi-processor scheduling module 22, a release signal 56 may be forwarded to the execution exclusion set module 26 corresponding to the current thread providing the instruction to suspend 40 or yield 44.

In one embodiment of an apparatus and method in accordance with the invention, an execution exclusion set module 26 may limit or otherwise control several threads related by membership in an execution exclusion set, or simply exclusion set. An execution exclusion set module 26 may be embodied to include an exclusion set executable 150 and one or more exclusion set objects 152. An exclusion set object 152 may correspond to a particular exclusion set, the members of which are threads that must not be executed in parallel in the multi-processor 10.

An exclusion set object 152 may contain a lock 154. The lock 154 may be thought of as a flag indicating that no new member thread of the exclusion set may be processed by the multi-processor 10. An occupant thread identifier 156 (occupant thread ID) may identify the thread that currently occupies the lock 154, making the lock 154 unavailable.

Since threads may recurse, the lock 154 may be recursively accessed, and made available within an original thread occupying the lock 154. Alteratively, one may think of the occupant thread as holding a key 154. So long as a calling thread holds the key 154 (occupies the right to be processed), the called thread may be permitted to exercise the rights of the occupant (calling) thread.

In one embodiment, a recursive depth counter 158 may reflect the recursive depth to which the lock 154 (e.g. key, etc.) has been recursively accessed. Thus, when the highest or root level of thread in the recursion is prepared to release the lock 154, stacks that may have been set, and the like, may be cleared by using the information in the recursive depth counter 158. If an occupied lock 154 is indeed occupied, threads 162 (actually thread identifiers 162, typically) may be queued in a waiting queue 160.

An exclusion set executable 150 may include several subordinate or constituent executables. An initialization executable 164 may initialize an exclusion set object 152, or other data structures, setting up memory space, and so forth. A create exclusion set executable 166 may create an exclusion set, such as by creating and defining an exclusion set object 152. A destroy exclusion set executable 168 may reverse the creation process, clearing memory spaces defining an exclusion set object 152.

A request to acquire executable 170 may field a request 52 received (see acquire signal 52, FIG. 2) from the multi-processor scheduling module 22. Likewise the request to acquire 170, or a similar executable, may respond to the multi-processing module 22 when a lock 154 is available for acquisition, or more typically, after it has been acquired by a thread from the waiting queue 160. A release lock executable 172 may operate to release (see release signal 56, FIG. 2) the occupied lock 154, once execution of a thread is stopped by the multi-processor scheduling module 22.

An enter set executable 174 and exit set executable 176 may serve to place a thread into or out of a particular exclusion set. For example, membership in an execution exclusion set may be transitory, subject to certain execution options represented in data. The enter and exit executables 174, 176 may thus provide information to and from thread control objects 30, such as membership data, and the like, as required to implement entry to and exit from an exclusion set, by a thread.

In some cases, an exclusion set may be bound to a single processor 12 (12a, 12b, or 12c) of the multi-processor 10. A CPU binding executable 178 may be included to perform this binding.

In order to execute, a particular thread, or virtual machine (both of which are seen or represented by the multi-processor scheduling module 22 as a single thread ready to execute), must obtain approval, such as by setting a flag, key, lock 154, link, or the like, corresponding to the respective execution exclusion set. If the key is not available, the lock 154 is occupied, then the execution exclusion set module 26 may prevent any new thread from executing until the key or lock 154 becomes available (unoccupied).

From the above discussion, it will be appreciated that the present invention provides a multi-processor scheduling kernel that minimizes cache thrashing, while providing selective control over execution of threads combined into a group defining a virtual machine. An apparatus and method in accordance with the invention provide true fair-share time allocation for multiple virtual machines, regardless of the number of threads in each virtual machine, and regardless of the number of processors available to run any virtual machine in a multi-processor. In one embodiment, a virtual machine scheduling module may schedule, with respect to each other, the threads within a particular virtual machine. A multi-processor scheduling module may schedule the respective virtual machines to be run, and may receive information from a respective virtual machine scheduling module to identify the thread, out of all threads in the virtual machine that is to be executed next.

The resume signal provided to the virtual machine scheduling module may also be forwarded to the execution exclusion set module. Likewise, the suspend signal provided to the multi-processor scheduling module may be forwarded simultaneously to the execution exclusion set module. With the available information regarding which threads have been suspended or resumed, the execution exclusion set module may manage the keys to control members of an exclusion set against parallel processing.

Upon initiation, or initialization, a signal may be provided to the execution exclusion set module directing the module to be engaged or disengaged. In general, the execution exclusion set module is an optional item and is not required for the multi-processor scheduling module. Likewise, a multi-processor scheduling module may be operated without a virtual machine scheduler. Nevertheless, the execution exclusion set module provides for consistent processing of non-parallel processable threads without funneling.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A multi-processor comprising:
   a memory device storing data structures for supporting execution of a multi-processor, the data structures including:
      a multi-processor scheduling kernel executable by the multi-processor, and
      a plurality of virtual machines, each virtual machine comprising a group of threads to be executed by a processor of the multi-processor; and
   a plurality of processors, operably connected to the memory device, each processor being programmed to execute a selected thread and to execute an instance of the scheduling kernel to schedule the execution of the selected thread, the instance of the scheduling kernel comprising:
      a multi-processor scheduling module for providing to the processor an order of execution for the each virtual machine, and
      a virtual machine scheduling module for providing to the multi-processor scheduling module, an order of execution for each thread of the group of threads.

2. The apparatus of claim 1, wherein the scheduling kernel is programmed to make a second scheduling decision corresponding to a second thread, logically noncontiguous with a first thread, which second scheduling decision depends upon a first scheduling decision previously made by the scheduling kernel and corresponding to the first thread.

3. The apparatus of claim 2, wherein the first thread and second thread are members of an aversion group for which scheduling the first thread for execution decreases the possibility of execution of the second thread simultaneously therewith.

4. The apparatus of claim 2, wherein the first thread and second thread are members of an aversion group for which scheduling the first thread for execution precludes execution of the second thread simultaneously therewith.

5. The apparatus of claim 2, wherein the first thread and second thread are members of an aversion group for which scheduling the first thread for execution on a processor decreases the possibility of a subsequent execution of the second thread on the same processor.

6. The apparatus of claim 2, wherein the first thread and second thread are members of an affinity group for which scheduling the first thread for execution increases the possibility of execution of the second thread simultaneously therewith.

7. The apparatus of claim 2, wherein the first thread and second thread are members of an affinity group for which scheduling the first thread for execution on a processor increases the probability of a subsequent execution of the second thread on the same processor.

8. The apparatus of claim 2, wherein the first thread and second thread are members of an aversion group constituting an exclusion group for which scheduling the first thread for execution precludes execution of the second thread simultaneously therewith.

9. The apparatus of claim 2, wherein the first thread and second thread are members of an aversion group constituting an exclusion group for which scheduling the first thread for execution on a processor precludes a subsequent execution of the second thread on the same processor.

10. The apparatus of claim 1, wherein the data structures further comprise execution groups for which a second scheduling decision made by the scheduling kernel and corresponding to one thread in a one execution group depends upon another scheduling decision made by the scheduling kernel and corresponding to another thread in the same execution group.

11. The apparatus of claim 1, wherein:
the data structures further comprise execution groups comprising group threads for which a second scheduling decision made by the scheduling kernel and corresponding to a second execution group depends upon a first scheduling decision made by the scheduling kernel and corresponding to a thread in the first execution group.

12. The apparatus of claim 1, wherein the scheduling kernel is programmed to make a second scheduling decision controlling scheduling of an execution of a second thread, which second scheduling decision depends upon a first scheduling decision made by the scheduling kernel and controlling scheduling of an execution of a first thread.

13. The apparatus of claim 12, wherein:
the scheduling kernel further comprises an execution set module, executable by the multi-processor to make the first and second scheduling decisions; and
the data structures further comprise an execution set for defining the first and second scheduling decisions with respect to the first and second threads.

14. The apparatus of claim 13, wherein the first thread is included in the execution set.

15. The apparatus of claim 14, wherein the second thread is included in the execution set.

16. The apparatus of claim 13, further comprising a plurality of execution sets.

17. The apparatus of claim 1, wherein the multi-processor scheduling module further comprises a scheduling executable for providing a fair-share scheduling process between a plurality of virtual machines.

18. The apparatus of claim 17, wherein the fair-share scheduling process comprises an executable for comparing one time corresponding to all threads of one virtual machine to another time corresponding to all threads of another virtual machine.

19. The apparatus of claim 18, wherein the one time and the other time correspond to latency data reflecting respective wait times corresponding to respective ready threads in the respective one and another virtual machines.

20. The apparatus of claim 17, wherein the fair-share scheduling process further comprises an executable for comparing one progress of execution of a first thread with another progress of execution of another thread.

21. The apparatus of claim 20, wherein the one and the other progress reflect execution times and comparative importance of the respective one and another threads.

22. The apparatus of claim 17, wherein the fair-share scheduling process comprises an executable for comparing one time corresponding to one processor to another time corresponding to another processor.

23. The apparatus of claim 22, wherein the one time and the other time correspond to latency data corresponding to the respective one and another processors.

24. The apparatus of claim 1, wherein the data structures further comprise global data, corresponding to a virtual machine of the plurality of virtual machines, and CPU-specific data corresponding to a processor of the multi-processor.

25. The apparatus of claim 1, wherein the multi-processor scheduling module further comprises:
latency data corresponding to a latency of execution of a ready thread;
a latency executable for acquiring the latency data; and
a loading executable for using the latency data to adjust the scheduling of processors in the multi-processor.

26. The apparatus of claim 1, wherein the data structures further comprise an independent scheduling policy and the virtual machine scheduling module is programmed to execute in accordance therewith to schedule the virtual machines.

27. A method for fair-share scheduling of a multi-processor, the method comprising:
providing a multi-processor;
providing a multi-processor scheduling module, executable by the multi-processor for scheduling execution, by the multi-processor, of threads;
providing fair-share scheduling information for controlling scheduling of the threads; and
executing the multi-processor scheduling module to schedule the threads according to the fair-share scheduling information.

28. A method for scheduling virtual machines on a multi-processor, the method comprising:
providing a multi-processor;
providing a plurality of virtual machines, each comprising threads executable by the multi-processor;
providing a virtual machine scheduling module, executable by the multi-processor for scheduling the plurality of virtual machines for execution;
providing a multi-processor scheduling module, executable by the multi-processor for scheduling execution, by the multi-processor, of the threads;
executing the virtual machine scheduling module to schedule the plurality of virtual machines; and
executing the multi-processor scheduling module to schedule the threads within each of the virtual machines.

29. The method of claim 28, wherein scheduling the plurality of virtual machines further comprises selecting a selected virtual machine from the plurality of virtual machines.

30. The method of claim 29, wherein scheduling the threads further comprises controlling a context switch between a rising thread and a falling thread selected from the threads of the selected virtual machine.

31. The method of claim 28, wherein scheduling the plurality of virtual machines further comprises ordering the plurality of virtual machines according to a fair-share scheduling policy.

32. The method of claim 28, further comprising providing, prior to executing the multi-processor scheduling module, an independent scheduling policy corresponding to a virtual machine of the plurality of virtual machines for controlling the multi-processor scheduling module in accordance therewith during execution of the threads corresponding to the virtual machine.

33. The method of claim 32, further comprising providing a plurality of independent scheduling policies corresponding, respectively, to the plurality of virtual machines.

34. The method of claim 28, further comprising:

providing an execution set comprising group threads;

providing an execution set module for controlling execution of the threads of the virtual machines in accordance with a relationship between the threads and the group threads.

35. The method of claim 34, wherein the execution set comprises an execution exclusion set.

36. The method of claim 35, wherein the execution set comprises an affinity group of threads.

37. The method of claim 34, wherein the execution set comprises an aversion group of threads.

38. The method of claim 34, wherein a selected thread, selected for execution from a selected virtual machine, is selected from within the execution group due to a status of the selected thread as a group thread.

39. The method of claim 34, wherein a selected thread of a selected virtual machine is selected from outside the execution group due to a status of the selected thread as not a group thread.

* * * * *

UNITED STATES PATENT AND TRADEMARK OFFICE
CERTIFICATE OF CORRECTION

| | | |
|---|---|---|
| PATENT NO. | : 6,269,391 B1 | Page 1 of 1 |
| APPLICATION NO. | : 08/878632 | |
| DATED | : July 31, 2001 | |
| INVENTOR(S) | : Bruce K. Gillespie | |

It is certified that error appears in the above-identified patent and that said Letters Patent is hereby corrected as shown below:

On the Title Pg, Item (60)
--Priority claim is amended to include U.S. Provisional Patent Application No. 60/039,064 filed on February 24, 1997.--

Signed and Sealed this
Twentieth Day of March, 2012

David J. Kappos
*Director of the United States Patent and Trademark Office*